United States Patent [19]

Rispeter

[11] Patent Number: 4,883,142

[45] Date of Patent: Nov. 28, 1989

[54] DRIVE ARRANGEMENT FOR CONNECTING A VEHICLE OUTPUT SHAFT TO A VEHICLE AXLE

[75] Inventor: Siegfried Rispeter, Besigheim, Fed. Rep. of Germany

[73] Assignee: Dr. Ing. h.c.F. Porsche AG, Weissach, Fed. Rep. of Germany

[21] Appl. No.: 242,312

[22] Filed: Sep. 9, 1988

[30] Foreign Application Priority Data

Sep. 9, 1987 [DE] Fed. Rep. of Germany ....... 3730251

[51] Int. Cl.⁴ .............................................. B60K 17/22
[52] U.S. Cl. ..................................... 180/245; 74/467; 74/665 T; 74/713
[58] Field of Search ...................... 180/233, 245, 73.1, 180/70.1, 246; 74/713, 665 T, 710, 467

[56] References Cited

U.S. PATENT DOCUMENTS

| | | | |
|---|---|---|---|
| 1,419,240 | 6/1922 | Dunham | 74/713 |
| 2,198,354 | 4/1940 | Tjaarda | 180/73.1 |
| 4,763,747 | 8/1988 | Müller | 180/245 |

FOREIGN PATENT DOCUMENTS

| | | | |
|---|---|---|---|
| 1429492 | 3/1976 | United Kingdom | 74/713 |
| 2038429 | 7/1980 | United Kingdom | 74/713 |

Primary Examiner—Mitchell J. Hill
Attorney, Agent, or Firm—Barnes & Thornburg

[57] ABSTRACT

In a drive arrangement for a motor vehicle, with an engine, a clutch, a change-speed transmission and an axle drive, the drive connection from the transmission output shaft to the axle drive shafts driving the vehicle wheels is constructed U-shaped. The clutch housing flangedly connected to the engine housing protrudes into the U-shaped intermediate space.

8 Claims, 3 Drawing Sheets

DRIVE ARRANGEMENT FOR CONNECTING A VEHICLE OUTPUT SHAFT TO A VEHICLE AXLE

BACKGROUND AND SUMMARY OF THE INVENTION

The present invention relates to an arrangement for the drive of a motor vehicle, with an engine, a clutch, a change-speed transmission and an axle drive.

It is of great significance for the driving dynamics of the motor vehicle how the drive unit consisting of engine, clutch, change-speed transmission and axle drive is arranged relative to the rear axle or front axle driven thereby. If the drive unit is seated at the front axle, then the engine is located in front of the front axle whereas if it is seated at the rear axle, then the engine is located to the rear of the rear axle; the change-speed transmission is always located on the other side of the axle. It is favorable for the driving behavior if the mass center of the engine is located as close as possible to the axle to be driven. With fulfillment of this requirement, the front section in front of the front axle, respectively, the rear section to the rear of the rear axle are reduced to the same extent whereby the overhang angle is increased in a desired manner. Therebeyond, this type of construction enables a reduction of the sweep-back (inclined position) of the axle drive shafts.

It is the object of the present invention to so construct the drive connection from the transmission output shaft to the vehicle axle to driven that the mass center of the engine is located as close as possible to this vehicle axle.

The underlying problems are solved according to the present invention in that the drive connection from the transmission output shaft to the axle drive shafts driving the vehicle wheels is constructed U-shaped. In a preferred embodiment according to the present invention, the transmission output shaft drives an intermediate shaft disposed parallel to the axle drive shafts by way of a bevel gear-angle drive, whereby spur gear pairs for the drive of the axle drive shafts are arranged on both sides at right angle. If the transmission output shaft drives, the axle drive shafts disposed parallel to the intermediate shaft by way of a U-shaped drive connection which is formed by an intermediate shaft and two spur gear pairs arranged on both sides thereof, then the engine can be moved as close as desired to the axle drive shafts, respectively, the vehicle axle by a corresponding dimensioning of the spur gear pairs. A clutch housing flangedly connected at the engine housing can thereby protrude into the U-shaped intermediate space of the drive connection. A further advantage of this arrangement resides in that a division of the driving torque takes place at the intermediate shaft which causes only slight bearing loads.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 3:
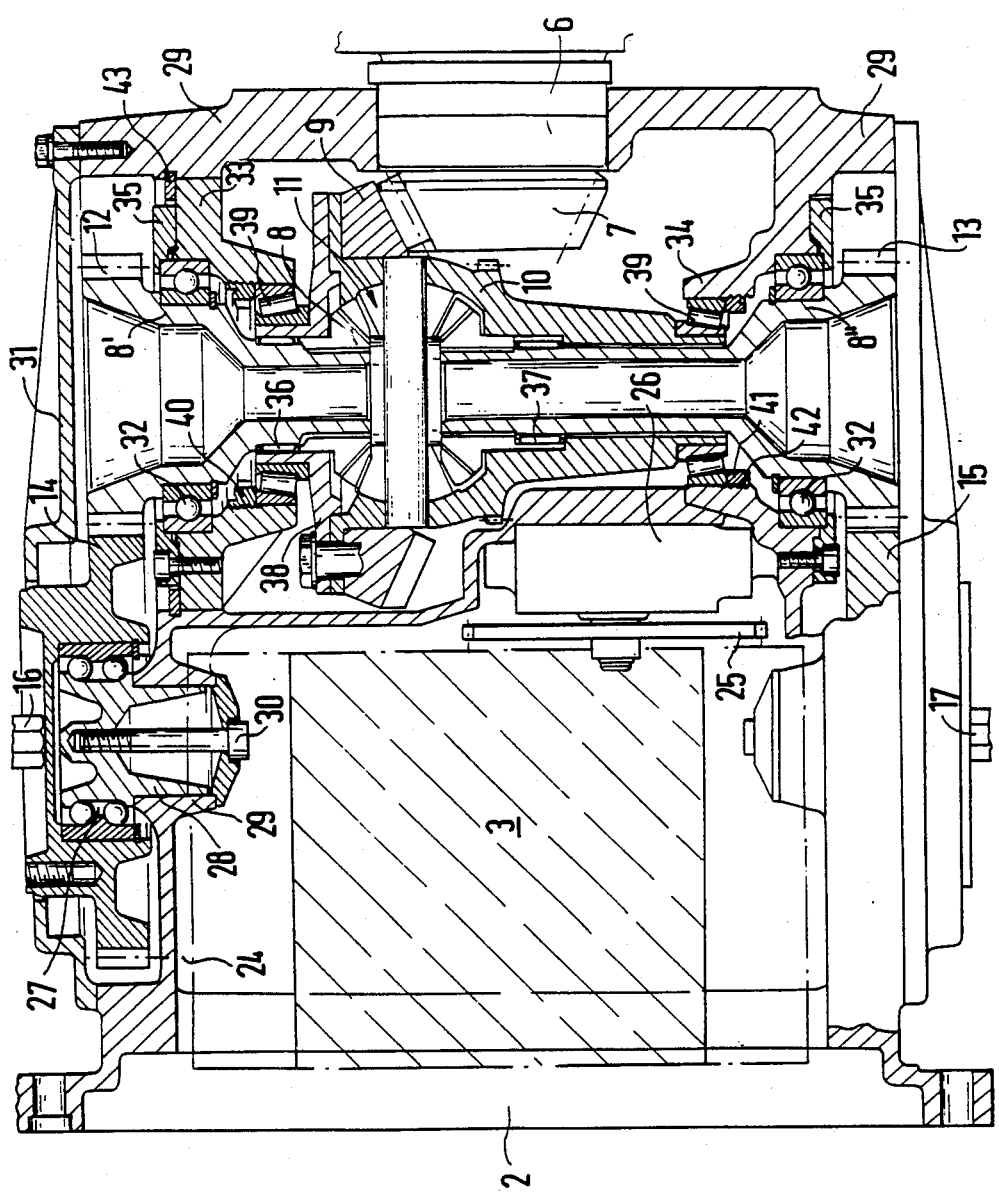
FIG. 3 is a longitudinal cross-sectional view through the drive connection in accordance with the present invention.

Referring now to the drawing wherein like reference numerals are used throughout the various views to designate like parts, a driving engine is arranged to the rear of the rear axle generally designated by reference numeral 1 of a motor vehicle, whose engine housing 2 is secured at the vehicle frame (not shown). A clutch housing 3 is flangedly connected to the engine housing 2; the clutch output shaft 4, shown in dash line, which exits from its end face, is at the same time the input shaft for a change-speed transmission 5. The transmission output shaft 6 is located spatially underneath the input shaft. A bevel pinion 7 is arranged end face on the transmission output shaft 6 which meshes with a bevel crown wheel 9 supported on an intermediate shaft 8. The intermediate shaft 8 consists of a shorter hollow shaft 8' and of a longer hollow shaft 8". The hollow shafts 8' and 8" are driven at their one ends by way of a differential bevel gear set 11 (FIG. 3) supported on a differential housing 10 and rotating with the same. At their other ends, the hollow shafts 8' and 8" are radially enlarged and are provided with spur gears 12 and 13 which mesh with spur gears 14 and 15 of larger diameter, at which are secured by means of bolts the axle drive shafts 16 and 17 which are parallel to the intermediate shaft 8.

Figure 1:
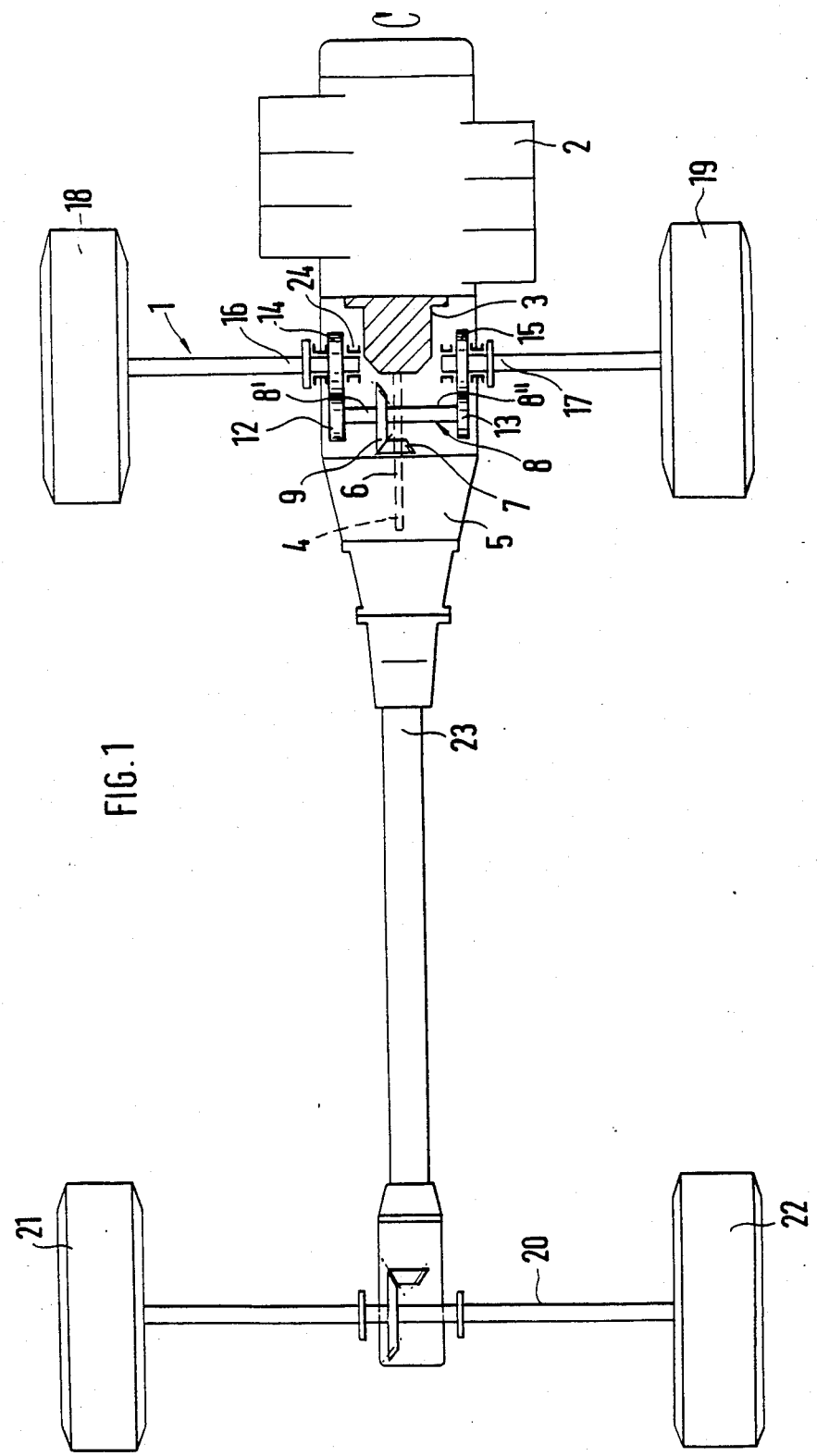
FIG. 1 is a plan view of the schematic drive arrangement of the motor vehicle in accordance with the present invention.
Figure 2:
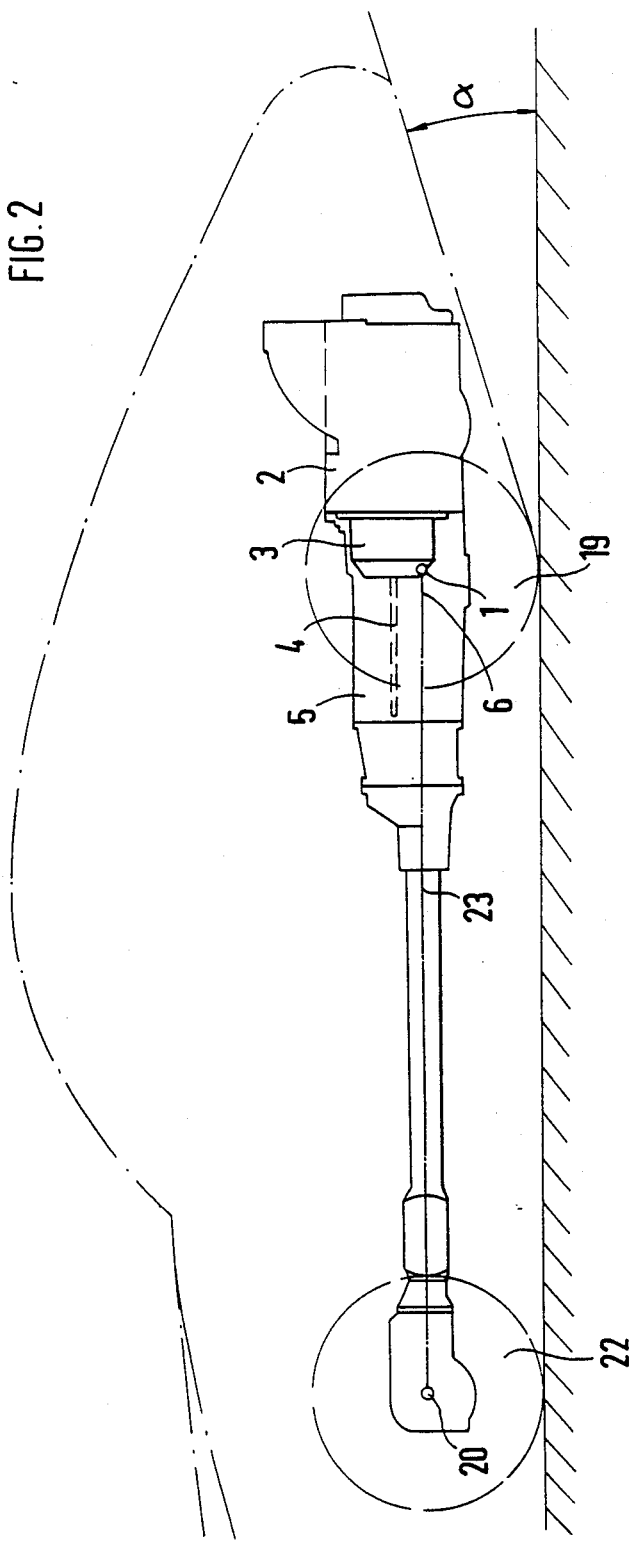
FIG. 2 is a side elevational view of a motor vehicle in accordance with the present invention.

The intermediate shaft 8 forms together with the spur gears 12 and 14 as well as 13 and 15 a U-shaped driven connection to the axle drive shafts 16 and 17 which drive the rear vehicle wheels 18 and 19. The front axle 20 and the two front wheels 21 and 22 are driven by the forward transmission output shaft 23 (FIGS. 1 and 2). The clutch housing 3 protrudes into the U-intermediate space 24 of the U-shaped drive connection. For that reason, the mass center of the engine housing 2 can be moved closer to the rear axle 1 which is of advantage for the driving dynamics of the motor vehicle. The rear body section can be smaller by that amount so that the overhang angle $\alpha$ (FIG. 2) is enlarged in a desired manner. The distance dimension of the engine housing 2 to the rear axle 1 can be further reduced in that the diameters of the spur gear pairs 12, 14 and 13, 15 are enlarged and thus the clutch housing 3 can protrude even more deeply into the U-intermediate space 24. Consequently, the engine-transmission arrangement can be matched without great constructive changes to the most different vehicle types. An oil pump 26 driven by the clutch by way of the spur gear 25 is also arranged in the U-shaped intermediate space 24 adjacent the clutch housing.

The transmission ratio from the transmission output shaft 6 to the axle drive shafts 16 and 17 is realized in two steps; namely, once at the bevel pinion 7—bevel crown wheel 9 and at the spur gears 12, 14, respectively, 13, 15. The moment division takes place from the differential gear in equal parts to the two axle drive shafts 16 and 17. For those reasons, the load on the bearings of the drive connection is considerably reduced.

The spur gears 14 and 15 coaxial to the axle drive shafts 16 and 17 are supported by means of double roller bearings 27 on bushings 28 which are centered in the axle housing 29 and are secured thereon by means of bolts 30. Both spur gear pairs 12, 14 and 13, 15 are closed off toward the outside by a cover plate 31 screwed to the axle housing 29. The spur gear 12 is milled end-face into the hollow shaft 8' while the spur gear 14 is milled end-face into the hollow shaft 8''. The outer roller bearings 32 for the hollow shafts 8' and 8'' which are located near these spur gears, are seated in bearing sleeves 33 and 34 fixed at the axle housing 29 and are axially retained by the arresting plates 35 threadably connected with the bearing sleeves 33 and 34. Needle bearings 36 and 37 in the differential housing 10 and a bearing cover 38 threadably secured thereat end-face serve as second bearings for the hollow shafts 8'' and 8'. The bearing cover in its turn and the opposite disposed end of the axle housing 10 is supported in conical roller bearings 39 which are seated in the bearing sleeves 33 and 34 of the axle housing 29. For adjusting the tooth clearance of the bevel gear—bevel crown wheel—angle drive 7, 9, the outer races of the cone roller bearings 39 are adjustable by nuts 40 and 41 which are screwed into the bearing sleeves 33 and 34. After the adjustment of the tooth clearance, the bearing sleeve 33, by further tightening of the nut 40, is axially placed against a snap ring 43 of the axle housing 29. After termination of the adjusting operation, the nuts 40 and 41 are held fast in the respective position by turning over the stop plates 42 provided at the same.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A drive arrangement for connecting a vehicle output shaft to a vehicle axle comprising an engine having an engine housing, an axle housing connected to said engine housing a clutch having a housing flangedly connected to the engine housing, a change-speed transmission having an output shaft and axle drive means including axle drive shafts and a U-shaped drive connection means forming a U-shaped intermediate space in said axle housing and connecting the transmission output shaft to the axle drive shafts driving vehicle wheels, the U-shaped connection means having an intermediate shaft substantially parallel to the axle drive shafts, a bevel gear-angle drive means connecting the transmission output shaft to the intermediate shaft and spur gear pairs for driving the axle drive shafts arranged on each end of the intermediate shaft substantially at right angles thereto, the clutch housing extending into the U-shaped intermediate space.

2. An arrangement according to claim 1, wherein the intermediate shaft includes a bevel gear-differential gear means for providing a differential movement on each end of the intermediate shaft.

3. An arrangement according to claim 2, wherein the axle drive means including an axle housing means, and wherein the intermediate shaft is composed of two hollow shafts which are supported at each end by bearing in the axle housing means.

4. An arrangement according to claim 3, wherein the differential gear means includes a differential housing means supported at each of its two ends by conical roller bearings which are fitted into bearing sleeves attached in the axle housing means.

5. An arrangement according to claim 4, wherein the bevel gear-angle drive means comprises a bevel pinion engaging a bevel crown wheel and means for adjusting tooth clearance at the bevel gear-angle drive means wherein the outer races of the conical roller bearings and therewith the differential housing means is adjustable in its axial position by nuts which are screwed into the bearing sleeves.

6. An arrangement according to claim 1, wherein an oil pump driven by the clutch is arranged in the U-shaped intermediate space between the axle housing means and the clutch housing.

7. An arrangement according to claim 2, wherein the differential gear means includes a differential housing means supported at each of its two ends in by conical roller bearings which are fitted into bearing sleeves attached in the axle housing means.

8. An arrangement according to claim 1, wherein the engine housing is arranged on one side of a vehicle axle and the change - speed transmission is arranged on the other side of the vehicle axle.

* * * * *